(12) United States Patent
Yu et al.

(10) Patent No.: US 8,842,571 B1
(45) Date of Patent: Sep. 23, 2014

(54) METHOD AND APPARATUS FOR DETERMINING A TIME OF ARRIVAL OF A DATA UNIT

(71) Applicant: Marvell International Ltd., Hamilton (BM)

(72) Inventors: Mao Yu, San Jose, CA (US); Hongyuan Zhang, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/186,997

(22) Filed: Feb. 21, 2014

Related U.S. Application Data

(60) Provisional application No. 61/768,079, filed on Feb. 22, 2013.

(51) Int. Cl.
*H04L 12/26* (2006.01)
*H04W 4/00* (2009.01)

(52) U.S. Cl.
CPC ................................. *H04L 43/067* (2013.01)
USPC ............................. 370/252; 370/328; 370/338

(58) Field of Classification Search
None
See application file for complete search history.

(56) References Cited

U.S. PATENT DOCUMENTS

| | | | |
|---|---|---|---|
| 8,233,457 B1 * | 7/2012 | Chen et al. ..................... | 370/332 |
| 8,270,909 B2 | 9/2012 | Zhang et al. | |
| 2007/0183541 A1 * | 8/2007 | Moorti et al. ................. | 375/341 |
| 2009/0196163 A1 | 8/2009 | Du | |
| 2010/0074198 A1 * | 3/2010 | Morioka ....................... | 370/329 |
| 2010/0309834 A1 | 12/2010 | Fischer et al. | |
| 2011/0002219 A1 | 1/2011 | Kim et al. | |
| 2012/0039196 A1 | 2/2012 | Zhang | |
| 2012/0269170 A1 * | 10/2012 | Chen et al. ..................... | 370/331 |
| 2013/0163702 A1 * | 6/2013 | Higuchi ........................ | 375/340 |
| 2013/0286959 A1 * | 10/2013 | Lou et al. ..................... | 370/329 |
| 2013/0301551 A1 * | 11/2013 | Ghosh et al. .................. | 370/329 |

FOREIGN PATENT DOCUMENTS

WO WO-2009-059229 A1 5/2009

OTHER PUBLICATIONS

IEEE Std 802.11vTM/D14.0 "Draft Standard for Information technology—Telecommunications and information exchange between systems—Local and metropolitan area networks—Specific requirements" Part 11: Wireless LAN Medium Access Control (MAC) and Physical Layer (PHY) specifications, Amendment 8: IEEE 802.11 Wireless Network Management *The Institute of Electrical and Electronics Engineers, Inc.*, (Aug. 2010).
Stacey et al., "IEEE P802.11, Wireless LANs, Proposed TGac Draft Amendment," Institute of Electrical and Electronics Engineers, doc. No. IEEE 802.11-10/1361r3 (Jan. 2011).
Stacey et al., "Specification Framework for TGac," document No. IEEE 802.11-09/0992r20, *Institute for Electrical and Electronics Engineers*, pp. 1-49, Jan. 18, 2011.

(Continued)

*Primary Examiner* — Clemence Han

(57) ABSTRACT

Methods, systems, and apparatus are described for processing a first field of a preamble of a data unit received by a communication device, the preamble including a second field that follows the first field in time. The embodiments described further include determining an estimated start of the second field of the preamble based on the processing of the first field, processing the second field of the preamble based on the estimated start of the second field, and determining an estimated time of arrival of the data unit at the communication device based on the processing of the second field of the preamble.

16 Claims, 4 Drawing Sheets

(56) References Cited

OTHER PUBLICATIONS

IEEE Std 802.11ac/D2.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.
IEEE Std 802.11ac/D2.1 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Mar. 2012.
IEEE Std 802.11ac/D3.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jun. 2012.
IEEE Std 802.11ac/D4.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Oct. 2012.
IEEE Std 802.11ac/D5.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2013.
IEEE Std 802.11ac/D6.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jul. 2013.
Perahia, et al., "Gigabit Wireless LANs: an overview of IEEE 802.11ac and 80211ad," ACM SIGMOBILE Mobile Computing and Communications Review, vo. 15, No. 3, pp. 23-33, Jul. 2011.
Love et al., "An Overview of Limited Feedback in Wireless Communication Systems," IEEE J. on Selected Areas in Communications, vo. 26, No. 8, Oct. 2008.
Ansari, et al., "Unified MIMO Pre-Coding Based on Givens Rotation," *The Institute of Electrical and Electronics Engineers*, doc. No. IEEE C802.16e-04/516r2, pp. 1-13, Jan. 11, 2005.
IEEE Std P802.11ad/D5.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 3: Enhancements for Very High Throughput in the 60 GHz Band," *The Institute of Electrical and Electronics Engineers, Inc.*, Sep. 2011.
IEEE Std 802.11adTM/D9.0 "Draft Standard for Information technology—Telecommunications and information Exchange Between Systems—Local and Metropolitan Area Networks—Specific Requirements" Part 11: Wireless LAN Medium Access Control (MAC) and Physical Layer (PHY) Specifications, Amendment 3: Enhancements for Very High Throughput in the 60 GHz Band *The Institute of Electrical and Electronics Engineers, Inc.*, (Jul. 2012).
Harada, "Project: IEEE P802.15 Working Group for Wireless Personal Area Network (WPANs)," IEEE 802.15-07-0693-003c (May 2007).
IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, (Mar. 29, 2012).
Aldana, et al., IEEE P802.11—Wireless LANs, "CIDs 46,47,48 Regarding Fine Timing Measurement," *The Institute of Electrical and Electronics Engineers, Inc.*, doc.: IEEE 802.11 11-12-1249-04-000m (Jan. 2013).

\* cited by examiner

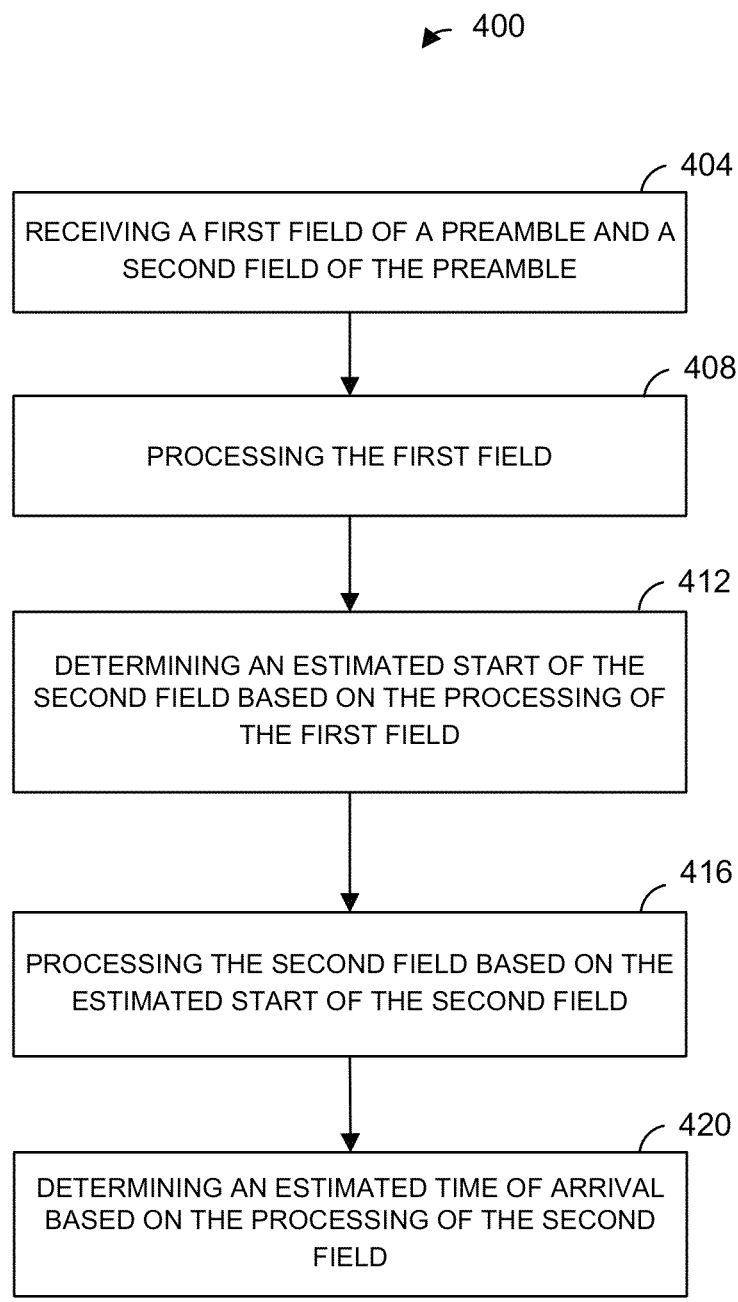

METHOD AND APPARATUS FOR DETERMINING A TIME OF ARRIVAL OF A DATA UNIT

CROSS REFERENCE TO RELATED APPLICATIONS AND INCORPORATION BY REFERENCE

This application claims the benefit of U.S. Provisional Application No. 61/768,079, entitled "Accurate Time Stamp for ToA for 802.11 based Location," filed on Feb. 22, 2013, which is hereby incorporated herein by reference in its entirety.

FIELD OF THE DISCLOSURE

The present disclosure relates generally to wireless communication networks and, more particularly, to methods and systems for calculating time-of-arrival time stamps within a wireless communication network.

BACKGROUND

Using location information amongst wireless communication networks such as wireless wide area networks (WWAN), wireless local area networks (WLAN), cellular networks, and wireless personal area networks (WPAN) has become increasingly common. Moreover, obtaining measurements of distance between communication devices within a wireless network is advantageous, since the measurements of distance provide insight regarding wireless ranging.

Global positioning systems (GPS) can be used to provide accurate information regarding the position of a communication device, but this requires the communication device to implement GPS hardware, thereby adding cost and complexity. Since GPS typically provides poor performance indoors, the use of GPS location for communication devices can be impractical. Therefore, signal strength is often used to determine distance measurements. More specifically, wireless devices typically perform calculations to determine a received signal strength indicator (RSSI). Using free space propagation loss calculations, a distance between two wireless communication devices can then be determined. But signal strength measurement distance calculations do not provide high accuracy distance measurements, since other factors can impact signal strength measurement, such as interference and/or the presence of other signals in the same or a nearby frequency band.

Therefore, another method to perform distance measurements utilizes the calculation of propagation time using timestamped time of arrival (ToA) and time of departure (ToD) information exchanged between two or more communication devices. Using the propagation time and the known speed at which the signal travels through the respective medium, a distance between the two communication devices can be calculated.

However, due to delays in the communication system, such as processing delays and/or signal group delay, timestamp calculations typically only provide accuracies resulting in a measurement resolution of 10 nanoseconds (ns) or more. As a result, distance calculations based on these timestamps can only determine a location of a communication device to within about 10 feet.

SUMMARY OF THE DISCLOSURE

Methods, systems, and apparatus are disclosed for determining accurate time of arrival (ToA) measurements at a communication device. By using correlation techniques typically used for synchronization, a coarse estimate of a detected symbol boundary terminating a short training sequence can be detected. Using this coarse estimate of the symbol boundary and a calculated detection time error, a highly accurate ToA time can be calculated.

In an embodiment, a method is described for processing a first field of a preamble of a data unit received by a communication device, the preamble including a second field that follows the first field in time. The method further includes determining an estimated start of the second field of the preamble based on the processing of the first field, processing the second field of the preamble based on the estimated start of the second field, and determining an estimated time of arrival of the data unit at the communication device based on the processing of the second field of the preamble.

In another embodiment, a communication device includes a wireless receiver device configured to process a first field of a preamble of a data unit received by the receiver device. The preamble also includes a second field that follows the first field in time. The wireless receiver device is further configured to determine an estimated start of the second field of the preamble based on the processing of the first field, process the second field of the preamble based on the estimated start of the second field, and determine an estimated time of arrival of the data unit at the receiver device based on the processing of the second field of the preamble.

BRIEF DESCRIPTION OF THE DRAWINGS

FIG. 4 is a flow diagram of an example method in accordance with an embodiment of the present disclosure.

DETAILED DESCRIPTION

Embodiments of methods and apparatus for estimating a time of arrival (ToA) of a data unit (e.g., a packet, a frame, etc.) are disclosed herein. Such ToA measurements are useful, for example, for measuring propagation time for transmissions between communication devices. In some embodiments, propagation time is measured using time stamps, such as time of time of departure (ToD) time stamps and ToA time stamps. In some scenarios and/or embodiments, propagation times may be on the order of nanoseconds, and thus accurate measurements of ToD and ToA is desired. Thus, various embodiments of techniques for accurately determining a ToA of a data unit are disclosed herein.

Figure 1:
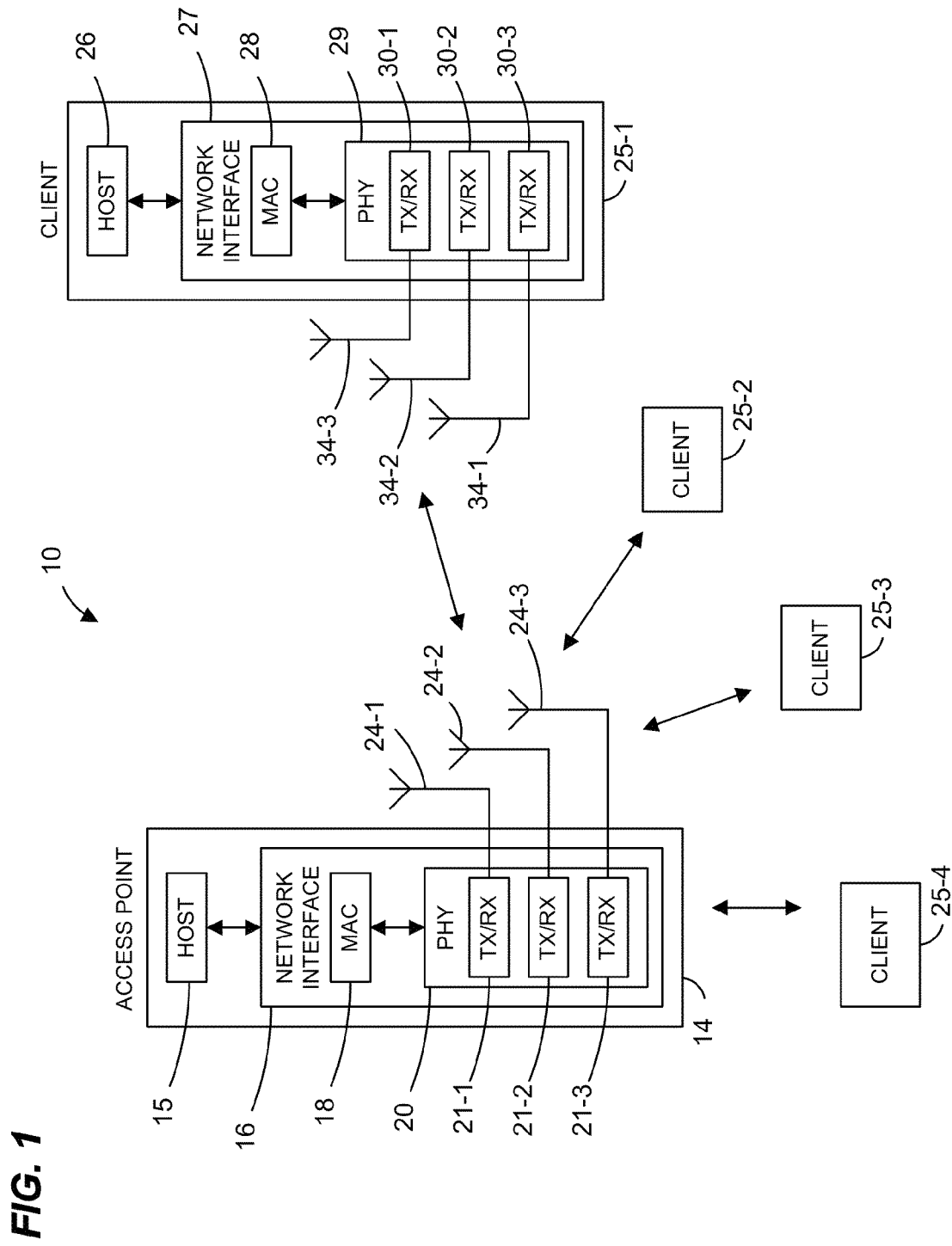
FIG. 1 is a block diagram of an example network 10 in which one or more communication devices utilize ToA measurement techniques, in accordance with an embodiment of the present disclosure.

FIG. 1 is a block diagram of an example network 10 in which one or more communication devices utilize ToA measurement techniques in accordance with an embodiment of the present disclosure. Network 10 includes an access point 14 and a plurality of clients 25.

Access point (AP) 14 includes a host processor 15 coupled to a network interface 16. Network interface 16 includes a medium access control (MAC) processing unit 18 and a physical layer (PHY) processing unit 20. PHY processing unit 20 includes one or more transceivers 21, which are coupled to one or more antennas 24. As will be appreciated by those of skill in the art, although three transceivers 21 and three antennas 24 are illustrated in FIG. 1, various embodiments of AP 14 include any suitable number (e.g., 1, 2, 4, 5, etc.) of transceivers 21 and any suitable number (e.g., 1, 2, 4, 5, etc.) of antennas 24. Further in accordance with various embodiments, any suitable number of transceivers 21 may be coupled to any suitable number of antennas 24, such that one or more antennas are shared between transceivers and/or vice versa.

Although four client stations 25 are illustrated in FIG. 1 as part of network 10, various embodiments of network 10 include any suitable number (e.g., 1, 2, 3, 5, 6, etc.) of client stations 25. A client station 25-1 includes a host processor 26 coupled to a network interface 27. Network interface 27 includes a MAC processing unit 28 and a PHY processing unit 29. PHY processing unit 29 includes one or more transceivers 30, which are coupled to one or more antennas 34. Although three transceivers 30 and three antennas 34 are illustrated in FIG. 1, various embodiments of client station 25-1 include any suitable number (e.g., 1, 2, 4, 5, etc.) of transceivers 30 and any suitable number (e.g., 1, 2, 4, 5, etc.) of antennas 34. Further in accordance with various embodiments, any suitable number of transceivers 30 may be coupled to any suitable number of antennas 34, such that one or more antennas are shared between transceivers and/or vice versa.

In accordance with various embodiments of the present disclosure, any suitable number of client stations 25-2, 25-3, and 25-4 has a structure the same as or substantially similar to client station 25-1. In accordance with such embodiments, client stations 25 structured the same as or substantially similar to client station 25-1 include any suitable number of transceivers and antennas. For example, although client station 25-1 is illustrated as having three transceivers 34 and antennas 30, various embodiments of client station 25-2 have a suitable number of transceivers different than three, and a suitable number of antennas different than three. The numbers of antennas and transceivers associated with clients 25-2, 25-3, and 25-4 is not shown in FIG. 1 for purposes of brevity.

Network 10 supports communications in accordance with any number of suitable communication protocols, such as mobile telephony protocols, wireless local area network (WLAN) communication protocols specified by one or more IEEE standards, wireless personal area communication network protocols (e.g., the BLUETOOTH® protocol), WiMAX, etc. Examples of suitable IEEE standards include 802.11a, 802.11g, 802.11n, 802.11ac, 802.11ad, 802.11af, 802.11v, and/or 802.11ah standards.

Although AP 14 is labeled as an access point, various embodiments of AP 14 are configured to support any suitable type of wireless communications and are not limited to supporting only WLAN technologies. For example, various embodiments of AP 14 are configured to support WLAN and/or mobile telephony protocols such as 3rd Generation Partnership Project (3GPP) technologies including Long Term Evolution (LTE) protocols. Although FIG. 1 illustrates only a single AP 14, various embodiments of client devices 25 are configured to communicate with more than a single AP at any time, including simultaneous communications with separate APs using communication protocols that may be the same or different from one another. In accordance with an embodiment of the present disclosure, AP 14 and client stations 25 are configured to transmit and receive data conforming to one or more communication protocols such as protocols conforming to one or more IEEE 802.11 standards or other suitable communication protocols. In accordance with another embodiment of the present disclosure, client stations 25 are configured, additionally or alternatively, to transmit and receive data with one another conforming to one or more communication protocols such as protocols conforming to one or more IEEE 802.11 standards, or other suitable communication protocols, to support ad-hoc networking.

In various embodiments, AP 14 and/or clients 25 determine timestamps associated with when data units are sent (Time-of-Departure (ToD) timestamps) and received (Time-of-Arrival (ToA) timestamps). These timestamps are generated using any suitable number of oscillators and/or clocks that are implemented within AP 14 and/or clients 25. AP 14 and/or clients 25 are configured to determine when their own data units are sent (ToD) to another communication device and to generate ToD time stamps that indicate when the data units were sent.

Similarly, AP 14 and/or clients 25 are configured to determine when data units are received (ToA) from another communication device and to generate ToA time stamps that indicate when the data units were received. In some embodiments, network interfaces 16, 27 are configured to calculate ToAs. In some embodiments, network interfaces 16, 27 are configured to add ToA time stamps to the data units for which the ToAs were calculated. In other embodiments, ToAs and/or ToA time stamps are kept separate from the data units for which the ToAs were calculated. As will be described in more detail below, network interfaces 16, 27 are configured to optionally transmit or feedback ToA time stamps and ToD timestamps to one or more other communication devices (e.g., the AP 14 and/or one or more clients 25) for facilitating the one or more other communication device in calculating a propagation time and/or round trip time corresponding to communications between communication devices in the network 10.

In various embodiments, network interfaces 16, 27 are configured to determine a ToA timestamp of a received data unit based on i) processing a first field in a preamble of the data unit to estimate a start of a second field of the preamble and/or a ToA of the data unit, and ii) processing the second field in the preamble to determine a more refined estimate of the second field of the preamble and/or the ToA. In some embodiments, calculation of the ToA takes into account processing delays at the network interface 16, 27.

Using the ToA and ToD timestamps, one or more of the network interfaces 16, 27 are configured to calculate a propagation time corresponding to transmission of signals between two or more devices in communication with one another. Since propagation time of signal transmissions occur at a known or assumed constant value (e.g., the speed of light in a particular propagation medium such as air) the distance between devices can be readily estimated from the propagation time. In this way, various embodiments of the present disclosure provide for the calculation of accurate distance information between AP 14 and/or clients 25 in communication with one another.

In accordance with various embodiments, AP 14 and/or client stations 25 (e.g. one or more of the network interfaces 16, 27) are configured to share the distance information with other communication devices within network 10, such as other clients 25 and/or the AP 14. In this way, the AP 14 and/or clients 25 obtain accurate distance information regarding other communication devices, allowing for more accurate wireless ranging assessments, for example.

Figure 2:
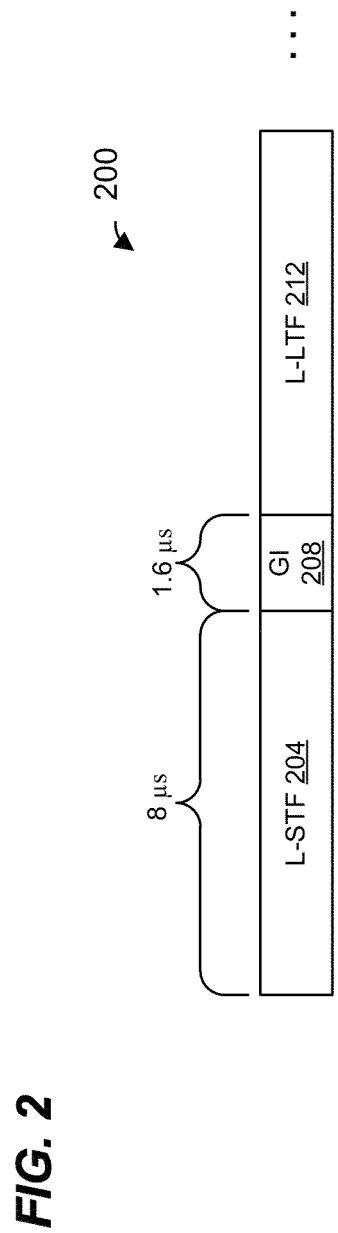
FIG. 2 is a diagram of a portion of a preamble of a data unit in accordance with an embodiment of the present disclosure.

FIG. 2 is a diagram of a portion of a preamble 200 of a data unit as specified by the IEEE 802.11 Standards. Embodiments are described herein in the context of the preamble 200 for illustrative purposes. In other embodiments, however, ToAs for data units conforming to other standards, formats, etc., are utilized.

The preamble 200 includes a legacy short training field (L-STF) 204, a guard interval (GI) 208, and a legacy long training field (L-LTF) 212. As will be appreciated by those of skill in the relevant art(s), the L-STF and L-LTF include a number of short and long training symbols, respectively, having a predetermined time duration and symbol pattern. The short training symbols in the L-STF 204 are often used for signal detection, automatic gain control, diversity selection, and coarse frequency offset estimation and timing synchronization. The long training symbols in the L-LTF 221, on the other hand, are often used for channel and fine frequency offset estimation.

In the preamble 200, the L-STF 204 is transmitted first, followed by the GI 208, which is followed by the L-LTF 212. As a result, when a data unit having the preamble 200 is received at a communication device, the L-STF 204 is received first, followed by the GI 208, which is followed by the L-LTF 212. The L-STF 204 has a duration of 8 microseconds (μs), and the GI 208 has a duration of 1.6 μs.

Figure 3:
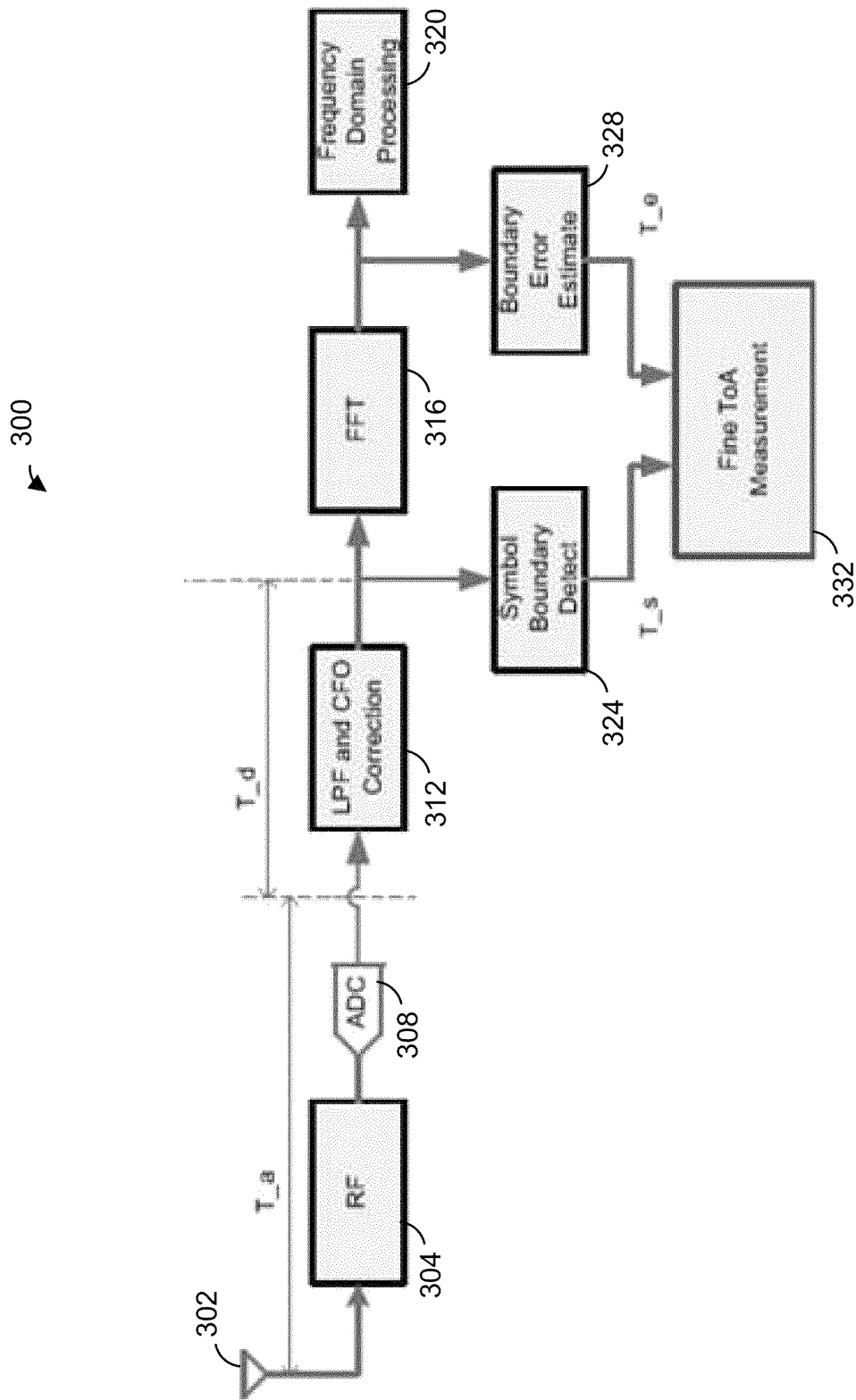
FIG. 3 is a block diagram of a wireless receiver device in accordance with an embodiment of the present disclosure.

FIG. 3 is a block diagram of a receiver device 300 in accordance with an embodiment of the present disclosure. Receiver device 300 includes an antenna 302, a radio frequency (RF) front end unit 304, an analog-to-digital converter (ADC) unit 308, a low-pass filter (LPF) and carrier frequency offset (CFO) correction unit 312, a fast Fourier transform (FFT) unit 316, a frequency domain processing unit 320, a symbol boundary detection unit 324, a boundary error estimate unit 328, and a fine ToA measurement unit 332.

In accordance with an embodiment, receiver device 300 is implemented within a communication device that is part of network 10, such as AP 14 and/or a client 25, for example. In accordance with some embodiments, antenna 302 is an implementation of antenna 24 and/or antenna 34. In some embodiments, receiver device 300 is implemented in network interface 16 and/or network interface 27.

RF front end unit 304 is coupled to antenna 302 and to ADC 308 and is configured to receive one or more signals transmitted from a communication device via antenna 302. RF front end unit 304 is configured to receive and condition signals received via antenna 302 prior to analog-to-digital conversion by ADC 308. As will be appreciated by those of skill in the relevant art(s), RF front end unit 304 can be implemented with any suitable number of amplifiers, attenuators, filters, impedance matching circuitry, mixers, local oscillators, etc. RF front end unit 304 is configured to pass the conditioned signals to ADC 308. The conditioned signals could include, for example, one or more intermediate frequency (IF) and/or base band signals.

ADC 308 is coupled to RF front end unit 304 and to LPF and CFO correction unit 312. ADC 308 is configured to convert conditioned signals received from RF front end unit 304 to the digital domain to provide a digital representation of the conditioned signals to LPF and CFO correction unit 312. As illustrated in FIG. 3, a time delay (processing delay) associated with receiving and processing signals through the RF front end unit 304 and the ADC unit 308 is denoted as the group delay $T_a$.

LPF and CFO correction module 312 is coupled to ADC unit 308 and to FFT unit 316. LPF and CFO correction module 312 is configured to receive the digital representation of the conditioned signals from ADC unit 204 and to perform digital filtering and/or carrier frequency offset correction on the digital signals. As will be appreciated by those of skill in the relevant art(s), low-pass filtering reduces noise and/or images introduced by the RF front end unit 304 and/or to reduce high-frequency noise. In an embodiment, LPF and CFO correction module 312 is configured to compensate for clock frequency offset (e.g., frequency drift) in an oscillator used to generate one or more carrier frequencies of the signal received at RF front end unit 304. LPF and CFO correction module 312 is configured to provide the digitally filtered and/or compensated signals to FFT unit 316. As illustrated in FIG. 3, the time delay (processing delay) associated with receiving and processing signals through the LPF and CFO correction module 312 and a symbol boundary detection unit 324 (discussed below) is be denoted as the data processing delay $T_d$.

FFT unit 316 is coupled to LPF and CFO correction module 312 and to frequency domain processing unit 320. FFT unit 316 is configured to implement one or more FFT algorithms on digital signals received via LPF and CFO correction module 312 to convert the received signal to a frequency domain representation. The FFT unit 316 provides the processed frequency component data to frequency domain processing unit 320.

Frequency domain processing unit 320 is coupled to FFT unit 316. Frequency domain processing unit 320 is configured to receive processed frequency component data from FFT unit 316 to extract data from the frequency components. In accordance with an embodiment, signals received at RF front end unit 304 conform to one or more wireless communication protocols having data spread across multiple subcarrier frequency bands (e.g., orthogonal frequency-division multiplexed (OFDM) signals). In accordance with such embodiments, FFT unit 316 subcarrier components to frequency domain processing unit 320. Frequency domain processing unit 320 then processes the subcarrier components to extract data in accordance with the respective communications protocol. For example, in some embodiments, frequency domain processing unit 320 includes a demodulator to demodulate the subcarrier components to recover data.

Referring now to FIGS. 2 and 3, in some embodiments, the ToA of a data unit including the preamble 200 is considered the time at which the beginning of the L-STF 204 (e.g., the left-hand side of L-STF 204) reaches the antenna 302 of the receiving device 300. In an embodiment, it takes the receiver device 300 a total time of $T_a+T_d$ to detect the L-STF 204 after the beginning of the L-STF 204 reaches the antenna 302. Thus, in some embodiments, the ToA and/or a course estimate of the ToA is calculated based on subtracting $T_a+T_d$ from a time at which the L-STF 204 is detected.

Symbol boundary detection unit 324 is configured to process signals output by LPF and CFO correction module 312. Symbol boundary detection unit 324 is configured to detect the L-STF 204, including, in some embodiments, detecting a known pattern of the L-STF 204. For example, in some embodiments, L-STF 204 includes a known repetitive pattern that can be detected using a variety of suitable techniques. For instance, in an embodiment, symbol boundary detection unit 212 includes an autocorrelator configured to calculate an autocorrelation on the signal output by LPF and CFO correction module 312. The end of the L-STF 204 is detected based on the autocorrelation, in some embodiments. In an embodiment, because the L-STF 204 has a defined duration (e.g., 8 μs, in an embodiment), the beginning of the L-STF 204 can be estimated by i) determining, based on the autocorrelation signal, a time at which the end of the L-STF 204 is detected, ii) subtracting the known duration of the L-STF 204, and iii) subtracting processing delays (e.g., subtracting $T_a+T_d$ in an embodiment).

In accordance with an embodiment, symbol boundary detection unit 324 is configured to detect the symbols of the L-STF 204 based on an autocorrelation. Once the symbols of the L-STF 204 are no longer detected, symbol boundary detection unit 324 determines a time associated with a symbol boundary $T_s$ between the L-STF 204 and the L-LTF 212, which could fall within the GI 208, in an embodiment. In some embodiments, symbol boundary $T_s$ provides, or is used to provide, an estimate of the beginning of L-LTF 212, and processing of the L-LTF 212 by receiver device 300 is based on the symbol boundary $T_s$. As will be appreciated by those of skill in the relevant art(s), symbol boundary detection unit 324 can be implemented with any suitable number of timers and/or counters to determine a time between when the packet is initially received and the symbol boundary. Once symbol boundary detection unit 324 calculates the symbol boundary time $T_s$, symbol boundary detection unit 324 provides the symbol boundary time $T_s$, to fine ToA measurement unit 332.

Again, the ToA is associated with a time when the data unit is initially received at antenna 302. As discussed above, however, the symbol boundary time $T_s$ occurs a time period after the beginning of the L-STF 204 is first received at antenna 302. In accordance with an embodiment, the durations of the L-STF 204, GI 208, and L-LTF 212, are known, constant values defined by the respective communications protocol. For example, in accordance with the IEEE 802.11 Standard, L-STF 204 includes ten, 0.8 µs symbols for a total duration of 8 µs, L-LTF 212 includes 2, 3.2 µs symbols for a total duration of 6.4 µs, and GI has a duration of 1.6 µs. As a result, the ToA can be determined from the symbol boundary time $T_s$ based on the known duration of the L-STF 204. More specifically, once the symbol boundary time $T_s$ is determined, a course estimate of the ToA can be calculated based on subtracting from time $T_s$ i) the time intervals associated with L-STF 204 and GI 208 (e.g., 9.6 µs in accordance with the 802.11 Standard), and ii) processing delays (e.g., $T_a+T_d$ in an embodiment).

In accordance with an embodiment of the present disclosure, an error $T_e$ between the estimated symbol boundary time $T_s$ and an actual symbol boundary is calculated and used to determine a more accurate ToA. Boundary error estimate unit 328 is coupled to fine ToA measurement unit 332. In an embodiment, boundary error estimate unit 328 is configured to estimate the timing error $T_e$ based on the L-LTF 212 in output of the FFT unit 316. In some embodiments, processing the L-LTF 212 provides more accurate timing synchronization information than detection of the L-STF 204 by the symbol boundary detection unit 324. After $T_e$ is determined, fine ToA measurement unit 332 uses $T_e$ to calculate a more accurate estimate of ToA (e.g., as compared to the course estimate of ToA). In some embodiments, boundary error estimate unit 328 is configured to process the L-LTF 212 based on estimated symbol boundary time $T_s$. For example, in some embodiments, boundary error estimate unit 328 uses estimated symbol boundary time $T_s$ as an estimated beginning of the L-LTF 212, or uses estimated symbol boundary time $T_s$ to calculate an estimated beginning of the L-LTF 212.

Boundary error estimate unit 328 is configured to estimate $T_e$ using any of a variety of suitable techniques. As merely an illustrative example, in an embodiment, boundary error estimate unit 328 is configured to analyze the frequency components of L-LTF 212 to determine phase shifts in the frequency domain caused by a time offset between estimated symbol boundary time $T_s$ and the actual symbol boundary time (e.g., the actual start of the L-LTF 212). For example, boundary error estimate unit 328 can calculate an average phase-shift between one or more adjacent subcarriers in accordance with the respective communications protocol and then translate this averaged phase shift into a time offset representative of $T_e$.

Although FIG. 3 illustrates boundary error estimate unit 328 analyzing the output of the FFT unit 316, in other embodiments, boundary error estimate unit 328 rather analyzes the output of the LPF and CFO correction unit 312 to estimate $T_e$ based on a time domain representation of the received signal. As merely an illustrative example, in an embodiment, boundary error estimate unit 328 includes an autocorrelator and performs autocorrelation on the L-LTF 212 to estimate $T_e$. For example, in an embodiment the L-LTF 212 includes two repeated symbols, and a more accurate estimate of the start of the L-LTF 212 can be determined based on the autocorrelation of the L-LTF 212.

Fine ToA measurement unit 332 is coupled to, and is configured to communicate with, symbol boundary detection unit 324 and boundary error estimate unit 328. In an embodiment, fine ToA measurement unit 332 is configured to calculate the ToA based on the group delay $T_a$, the processing delay $T_d$, the duration of the L-STF 204, the duration of the GI 208, and the error estimate $T_e$ in accordance with Equ. 1 as provided below.

$$ToA = (T_S - T_{STF} - T_{GI} - T_d - T_a + T_e) \qquad \text{Equ. 1}$$

where $T_{STF}$ is the duration of the L-STF 204, and $T_{GI}$ is the duration of the GI 208.

In some embodiments, fine ToA measurement unit 332 is configured to access a memory (e.g., a look up table) that stores group and/or processing delays (e.g., $T_a$ and $T_d$). For example, in some embodiments, measurements of group and/or processing delays (e.g., $T_a$ and $T_d$) are made and then stored in the memory. In some embodiments, fine ToA measurement unit 332 is configured to select appropriate processing delay and/or group delay values corresponding to a particular communication protocol.

In some embodiments, fine ToA measurement unit 332 is configured to determine the group and/or processing delays through a self-calibration procedure and store the determined group and/or processing delays (e.g., $T_a$ and $T_d$) in the memory.

In an embodiment, the processing and/or functionality provided by any combination of LPF and CFO correction unit 312, FFT unit 316, frequency domain processing unit 320, symbol boundary detection unit 324, boundary error estimation unit 328, and/or fine ToA measurement unit 332 are implemented using any suitable number of processors, controllers, integrated circuits, etc.

FIG. 4 is a flow diagram of an example method 400 for determining a ToA of a data unit, according to an embodiment. The method 400 is implemented, in an embodiment, by the receiver device 300 of FIG. 3, and the method 400 is discussed with reference to FIGS. 2 and 3 for illustrative purposes. In other embodiments, however, the method 400 is implemented by another suitable receiver device and/or in connection with another suitable communication protocol other than the IEEE 802.11 Standard.

At block 404, a first field and a second field of a preamble of a data unit are received at a receiver device. For example, in an embodiment, the L-STF 204 and the L-LTF 212 are received.

At block 408, the first field of the preamble is processed by the receiver device. For example, the L-STF 204 is processed to detect the L-STF 204, in an embodiment. For example, symbol boundary detect unit 324 performs an autocorrelation on L-STF 204 to detect L-STF 204.

At block 412, an estimate of the start of the second field is determined based on the processing of the first field. For example, symbol boundary detect unit 324 estimates $T_s$, in an embodiment, and $T_s$ provides, or is used to provide an estimate of the beginning of the L-LTF 212, in an embodiment. Symbol boundary detect unit 324 estimates $T_s$ based on the autocorrelation performed on L-STF 204, in an embodiment.

At block 416, the second field is processed based on the estimated beginning of the second field. For example, in an embodiment, boundary error estimate 328 utilizes $T_s$ to process L-LTF 212. In an embodiment, processing the second field includes determining an estimated error between the estimated start of the second field and an actual start of the second field.

At block 420, an estimated ToA of the data unit is determined based on processing of the second field. For example, in an embodiment, the processing of the second field includes determining the estimated error between the estimated start of the second field and an actual start of the second field, the estimated error is used to calculate the ToA. For example, the ToA is calculated using Equ. 1 or a suitable similar equation, in some embodiments. Block 420 is implemented by fine ToA measurement unit 332, in an embodiment.

The Figures presented herein are for illustrative purposes. Communications and/or couplings between various elements illustrated throughout the Figures may be performed using any type of coupling or means of communications to accomplish the corresponding operations as described herein. For example, even though single lines are used to illustrate communications between some elements, this communication may be implemented with any number of wires and/or buses. Furthermore, such communications may be implemented with any appropriate communication protocol, such as serial or parallel communications, regardless of the illustrated couplings.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable storage medium such as on a magnetic disk, an optical disk, in a RAM or ROM or flash memory, tape drive, etc. Likewise, the software or firmware instructions may be delivered to a user or a system via any known or desired delivery method. The software or firmware instructions may include machine readable instructions that, when executed by the processor, cause the processor to perform various acts.

When implemented in hardware, the hardware may comprise one or more of discrete components, an integrated circuit, an ASIC, a programmable logic device (PLD), etc.

What is claimed:

1. A method, comprising:
processing, at a communication device, a first field of a preamble of a data unit received by the communication device, wherein the preamble also includes a second field that follows the first field in time;
determining, at the communication device, an estimated start of the second field of the preamble based on the processing of the first field;
processing, at the communication device, the second field of the preamble based on the estimated start of the second field; and
determining, at the communication device, an estimated time of arrival of the data unit at the communication device based on the processing of the second field of the preamble.

2. The method of claim 1, wherein:
the first field is a short training field (STF) of the preamble; and
the second field is a long training field (LTF) of the preamble.

3. The method of claim 2, wherein:
processing the first field comprises performing, at the communication device, an autocorrelation operation on the STF; and
determining the estimated start of the second field comprises determining an estimated start of the LTF based on the autocorrelation operation performed on the STF.

4. The method of claim 1, wherein determining the estimated time of arrival of the data unit comprises:
determining, at the communication device, a first estimated time of arrival based on the estimated start of the second field; and
determining, at the communication device, a second estimated time of arrival based on i) the first estimated time of arrival, and ii) the processing of the second field of the preamble.

5. The method of claim 4, wherein:
determining the estimated time of arrival of the data unit further comprises determining a time of arrival adjustment based on the processing of the second field of the preamble; and
determining the second estimated time of arrival comprises adjusting the first estimated time of arrival using the time of arrival adjustment.

6. The method of claim 1, further comprising receiving, at the communication device, the data unit.

7. An apparatus, comprising:
a wireless receiver device configured to:
process a first field of a preamble of a data unit received by the receiver device, wherein the preamble also includes a second field that follows the first field in time,
determine an estimated start of the second field of the preamble based on the processing of the first field,
process the second field of the preamble based on the estimated start of the second field, and
determine an estimated time of arrival of the data unit at the receiver device based on the processing of the second field of the preamble.

8. The apparatus of claim 7, wherein:
the first field is a short training field (STF) of the preamble; and
the second field is a long training field (LTF) of the preamble.

9. The apparatus of claim 8, wherein the wireless receiver device comprises a boundary detector configured to:
perform an autocorrelation to detect the SFT; and
determine the estimated start of the LTF based on the autocorrelation operation performed on the STF.

10. The apparatus of claim 7, wherein the wireless receiver device is configured to:
determine a first estimated time of arrival based on the estimated start of the second field; and
determine a second estimated time of arrival based on i) the first estimated time of arrival, and ii) the processing of the second field of the preamble.

11. The apparatus of claim 10, wherein the wireless receiver device is configured to:
determine a time of arrival adjustment based on the processing of the second field of the preamble; and
adjust the first estimated time of arrival using the time of arrival adjustment.

12. The apparatus of claim 7, wherein the wireless receiver device comprises:

a symbol boundary detection unit configured to determine the estimated start of the second field;

a boundary error estimator unit configured to determine an estimated error between the estimated start of the second field and an actual start of the second field based on processing the second field; and a fine ToA measurement unit configured to determine the estimated time of arrival based on the estimated start of the second field and the estimated error.

13. The apparatus of claim 7, wherein the wireless receiver device comprises:

a radio frequency (RF) front end unit; and an analog-to-digital converter (ADC) coupled to the RF front end unit, the ADC configured to generate a digital representation of a signal received via the RF front end unit;

wherein the wireless receiver device configured to process the first field and process the second field by processing the digital representation of a signal received via the RF front end unit.

14. The apparatus of claim 13, wherein the wireless receiver device further comprises:

signal processing unit coupled to the ADC to generate a processed signal; and wherein the wireless receiver device configured to process the first field and process the second field by processing the processed signal.

15. The apparatus of claim 14, wherein the wireless receiver device further comprises:

a fast Fourier transform (FFT) unit configured to convert the processed signal to a frequency domain representation; and a frequency domain processing unit configured to process the frequency domain representation.

16. The apparatus of claim 7, further comprising an antenna coupled to the wireless receiver device.

* * * * *